United States Patent [19]
Shallenberger, Jr.

[11] 3,963,365
[45] June 15, 1976

[54] DRILL WITH INDEXABLE INSERTS

[75] Inventor: Fred T. Shallenberger, Jr., Caledonia, Ill.

[73] Assignee: Metal Cutting Tools, Inc., Rockford, Ill.

[22] Filed: May 7, 1975

[21] Appl. No.: 575,334

[52] U.S. Cl. .............................. 408/186; 408/199; 408/713
[51] Int. Cl.² ...................................... B23B 51/00
[58] Field of Search ............ 408/144, 186, 57, 713, 408/59, 211, 212, 213, 215, 227; 29/96 R

[56] References Cited
UNITED STATES PATENTS

| | | | |
|---|---|---|---|
| 3,540,323 | 11/1970 | Rishel | 408/186 |
| 3,737,245 | 6/1973 | Mater | 408/59 X |
| 3,740,807 | 6/1973 | Getts | 29/96 R |
| 3,816,018 | 6/1974 | Hlocky | 408/59 |

FOREIGN PATENTS OR APPLICATIONS

| | | | |
|---|---|---|---|
| 751,130 | 1/1967 | Canada | 408/211 |
| 1,200,127 | 7/1970 | United Kingdom | 408/57 |

Primary Examiner—Othell M. Simpson
Assistant Examiner—William R. Briggs
Attorney, Agent, or Firm—Wolfe, Hubbard, Leydig, Voit & Osann, Ltd.

[57] ABSTRACT

A drill having inner and outer indexable cutting inserts for forming a hole in a workpiece. The inner insert is positioned at a non-negative radial angle and is set out axially ahead of the outer insert to increase the service life of the inserts. Tungsten carbide wear strips are spaced angularly around the drill body to limit radial movement of the body and to prevent the body from wearing.

6 Claims, 5 Drawing Figures

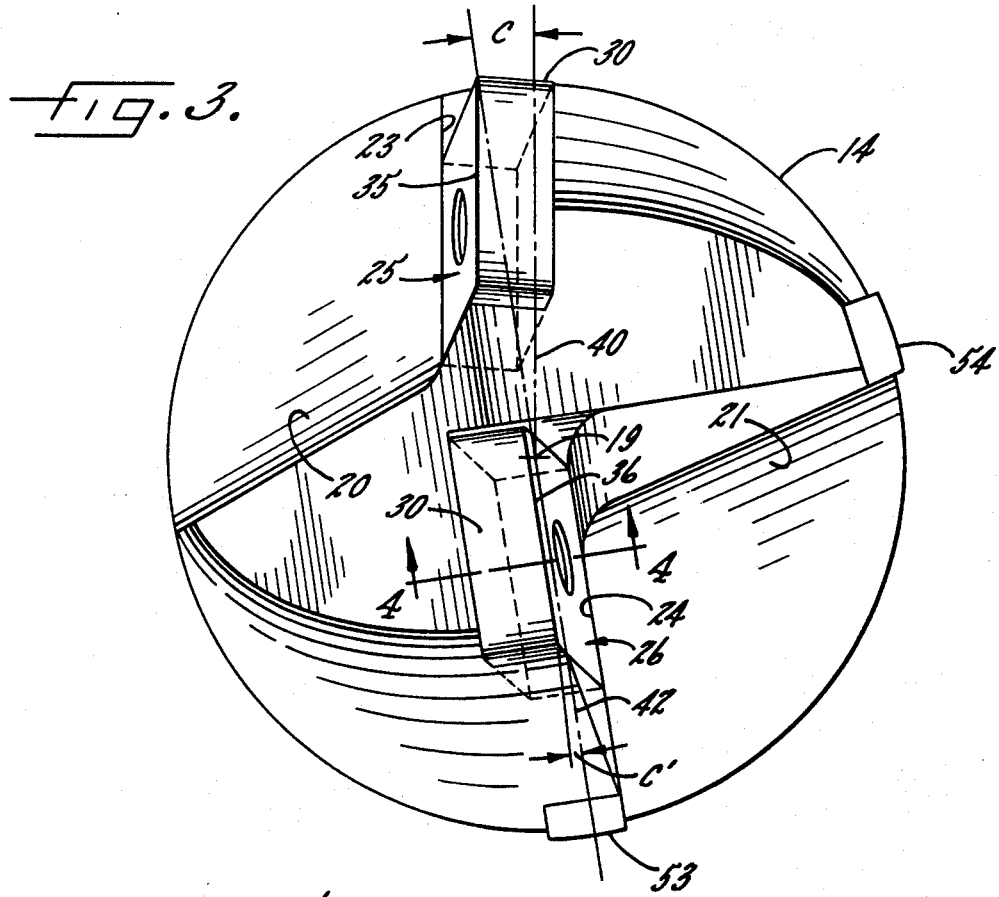
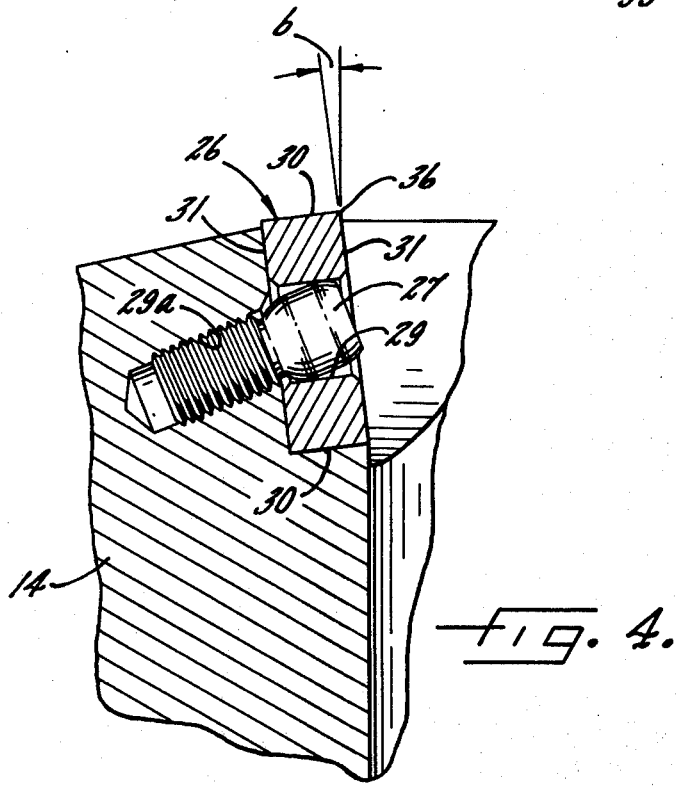

DRILL WITH INDEXABLE INSERTS

BACKGROUND OF THE INVENTION

This invention relates to a drill with indexable cutting inserts for forming a hole in a workpiece made of metal or the like. More particularly, the invention relates to a drill of the same general type as disclosed in Rishel U.S. Pat. No. 3,540,323 in which an outer cutting insert is positioned to remove material from the peripheral surface of the hole toward the center of the hole while an inner insert is positioned to remove material from the center of the hole toward the peripheral surface thereof.

SUMMARY OF THE INVENTION

The general aim of the present invention is to provide a new and improved drill of the above character which is constructed in such a manner as to enable the cutting inserts to experience a longer service life than the inserts of prior drills of the same general type.

Another object is to uniquely position the inserts so as to avoid crushing the inserts and also to avoid damaging the inactive cutting edges of the inserts while the workpiece is being drilled by the active cutting edges of the inserts.

A more detailed object of the invention is to achieve the foregoing by locating the inner insert such that the active cutting edge of the insert is disposed at a non-negative radial angle and is positioned with its radially outermost point set out axially ahead of the radially innermost point of the active cutting edge of the outer insert.

The invention also resides in the novel provision of at least one and preferably a plurality of hard wear strips on the periphery of the drill body to cause the drill to advance in a substantially straight line and to prevent the drill body from rubbing against and being worn by the peripheral surface of the hole.

These and other objects and advantages of the invention will become more apparent from the following detailed description when taken in conjunction with the accompanying drawings.

BRIEF DESCRIPTION OF THE DRAWINGS

FIG. 3 is an end view showing the tip of the drill.

FIG. 4 is a fragmentary cross-section taken substantially along the line 4—4 of FIG. 3.

DETAILED DESCRIPTION OF THE PREFERRED EMBODIMENT

Figure 1:
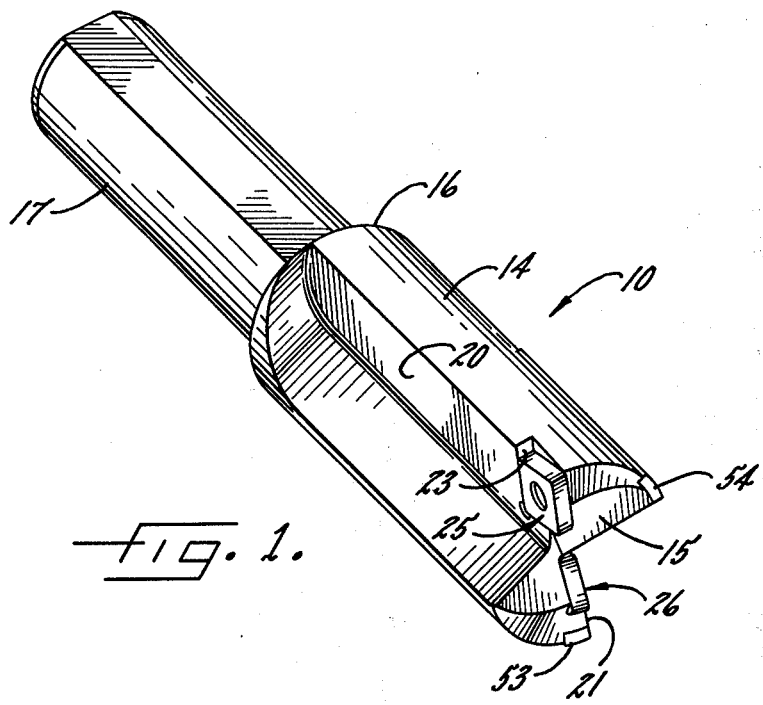
FIG. 1 is a perspective view of a new and improved drill incorporating the novel features of the present invention.
Figure 2:
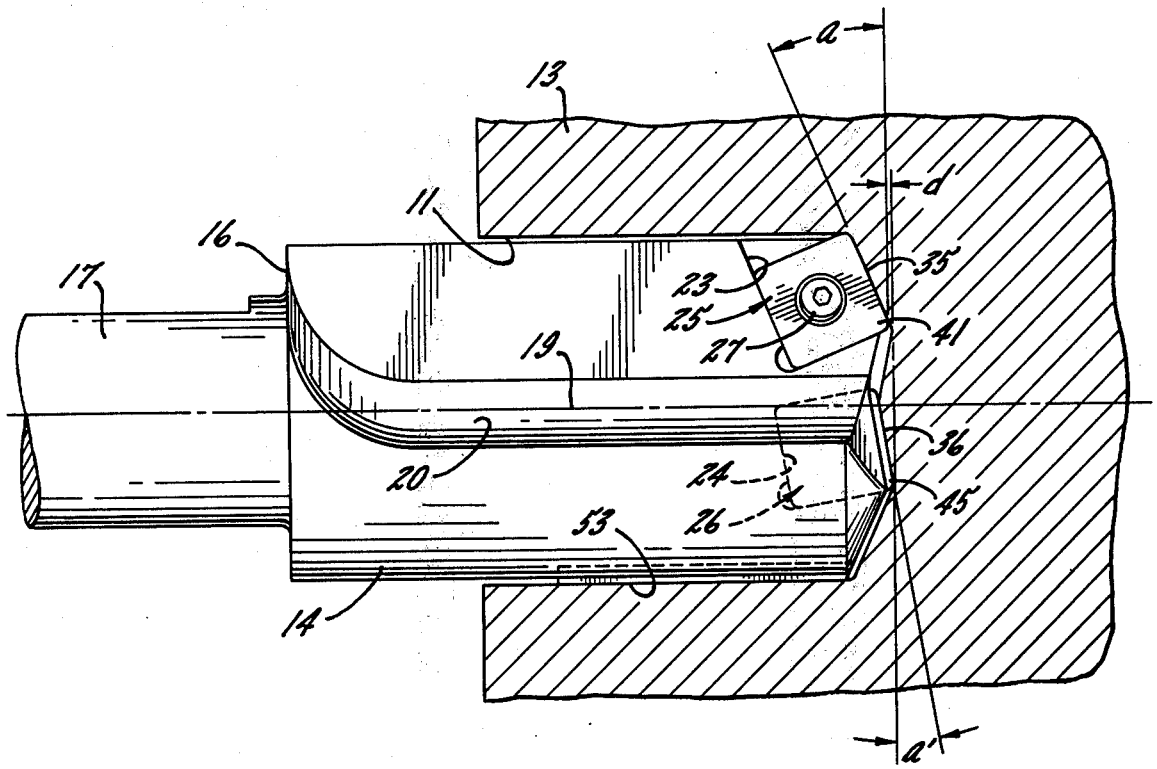
FIG. 2 is a fragmentary side elevation of the drill and showing the drill as positioned within a hole in a workpiece.

As shown in the drawings for purposes of illustration, the invention is embodied in a drill 10 for forming a cylindrical hole 11 (FIG. 2) in a workpiece 13 made of iron, steel or other metal. The drill is of the same general type as disclosed in the aforementioned Rishel patent and comprises an elongated and generally cylindrical body 14 (FIG. 1) made of high carbon steel and having a tip end 15 and opposite shank end 16. A reduced diameter shank 17 is formed integrally with the shank end of the body and is adapted to be clamped in a power-rotated holder (not shown) for effecting rotation of the drill about its axis 19, the rotation herein being in a counterclockwise direction as viewed in FIG. 3.

Two angularly spaced and substantially V-shaped grooves 20 and 21 are formed in the body 14 and open out of the tip end 15 thereof to enable metal chips to escape out of the hole 11. Recesses 23 and 24 (FIG. 2) are formed in the tip end portions of the leading walls of the grooves 20 and 21, respectively, and define seats for receiving and locating indexable cutting inserts 25 and 26 preferably but not necessarily made of tungsten carbide. Each insert is releasably clamped to the body 14 by a threaded locking pin 27 (FIG. 4) which extends through a central hole 29 in the insert and which is threaded into a hole 29a formed in the leading wall of the groove 20, 21. The locking pins may be of the same general type as disclosed in Getts U.S. Pat. No. 3,740,807.

Each insert 25, 26 is generally square in shape and is of the negative type in that each of the four narrow edge faces 30 (FIG. 4) of the insert extends perpendicular to the two wider side faces 31 in which the hole 29 is formed. As a result, each insert includes eight available cutting edges which are defined at the intersections of the edge and side faces 30, 31 and which may be sequentially brought into active cutting position by indexing the insert through steps of ninety degrees and then subsequenting inverting and re-indexing the insert. In the drawings, the presently active cutting edge of the insert 25 has been indicated by the reference numeral 35 while the presently active cutting edge of the insert 26 has been indicated by the reference numeral 36.

During a drilling operation, the cutting edge 35 of the insert 25 removes metal from the peripheral wall of the hole 11 and inwardly toward the center of the hole in a cutting arc whose width in this particular instance is substantially equal to one-half the radius of the hole. At the same time, the cutting edge 36 of the insert 26 removes metal from the center of the hole and outwardly toward the peripheral wall of the hole in an arc of substantially equal width (see FIG. 2). This is achieved by forming the recesses 23 and 24 in radially offset positions in the body 14 so that the insert 25 is positioned radially outwardly of the insert 26. Moreover, the recess 23 locates the insert 25 so that its cutting edge 35 is inclined at a predetermined lead angle $a$ (FIG. 2) and progresses away from the shank end 16 of the body 14 as the edge progresses inwardly from the peripheral surface of the body toward the center thereof through a distance equal to approximately one-half the radius of the hole 11. The inner recess 24 locates the inner insert 26 such that its cutting edge 36 is inclined at a lead angle $a'$ (which need not necessarily be equal to the lead angle $a$) and progresses away from the shank end 16 of the body 14 upon progressing outwardly through a substantially equal distance from the center of the body toward the peripheral surface thereof.

To prevent those edge faces 30 directly adjacent the cutting edges 35, 36 from rubbing against the bottom wall of the hole 11, each recess 23, 24 positions its respective insert 25, 26 at a negative axial angle $b$ (FIG. 4) so that the wide cutting face 31 (i.e., the leading face) of the insert is located ahead of the cutting edge. As a result of each insert being disposed at a negative axial angle, the edge face 30 directly adjacent the cutting edge defines a clearance face which is spaced from and disposed out of contact with the bottom of the hole when the drill 10 is rotated. In order to prevent the outboard edge face of the outer insert 25 from rubbing against the peripheral wall of the hole 11, the outer insert is positioned by the recess 23 such that the cutting edge 35 is located at a negative radial angle $c$ (FIG. 3). That is to say, the cutting edge 35 is positioned ahead of the most nearly adjacent radial line 40 that extends parallel to the cutting edge and thus clearance is established between the outboard edge face 30 and the peripheral wall of the hole 11.

As discussed thus far, the present drill 10 is virtually the same as the drill described in the Rishel patent. The present invention is based on my discovery that the life of the inserts 25 and 26 of such a drill can be lengthened significantly by uniquely positioning the inner insert 26 so as to avoid any danger of such insert being crushed and also to enable the inner insert to establish clearance for the innermost corner portion 41 (FIG. 5) of the outer insert 25 and thereby prevent the innermost corner portion from breaking up against the bottom of the hole 11.

In keeping with the invention, the inner insert 26 is positioned such that its cutting edge 36 is located at a non-negative radial angle $c'$ (FIG. 3) and further is positioned such that the radially outermost point 43 (FIG. 5) along its straight cutting edge 36 is set out axially ahead of the radially innermost point 44 along the straight cutting edge 35 of the outer insert 25. The non-negative radial angle $c'$ of the cutting edge 36 is established by locating the inner insert 26 such that its cutting edge either lies precisely along or is disposed just slightly behind the most nearly adjacent radial line 42 (FIG. 3) which extends either along or parallel to the cutting edge. By locating the cutting edge 36 precisely along such radial line 42, a zero radial angle is established and this will prevent the insert 26 from being crushed in the hole 11. Manufacturing tolerances, however, make it difficult to locate the cutting edge 36 precisely at a zero radial angle and, in order to insure against the inner insert 26 being located with its cutting edge at a negative radial angle, the recess 24 is intentionally machined to locate the cutting edge at a positive radial angle $c'$. Thus, the cutting edge lies slightly behind the aforementioned radial line as shown in FIG. 3.

As mentioned above, the inner insert 26 is positioned such that the radially outermost point 43 (FIG. 5) of its straight cutting edge 36 is set out axially ahead of the radially innermost point 44 of the straight cutting edge 35 of the outer insert 25. Moreover, the inner insert 26 is positioned radially such that its radially outermost corner portion 45 radially overlaps the path swept by the radially innermost corner portion 41 of the outer insert 25. This is achieved by locating the recesses 23 and 24 such that the relationship of the lead angle $a$ to the lead angle $a'$ and the relative bodily positioning of the inserts along the axis 19 of the body 14 cause the point 43 to project axially beyond the point 44 by a distance $d$ (FIG. 5) of about .010 inch. In addition, the insert 26 is positioned radially so as to cause an axially set out part of its outermost corner portion 45 to be located radially outwardly of the point 50 where the innermost corner portion is tangent to a radius 51 of the body 14. This relationship is illustrated most clearly by FIG. 5 which schematically shows one angular position of the innermost corner portion 41 of the outer insert 25 and which further shows the position which would be occupied by the outermost corner portion 45 of the inner insert 26 if the drill 10 were rotated so as to bring the outermost corner portion 45 into the same angular position as the innermost corner portion 41.

Figure 5:
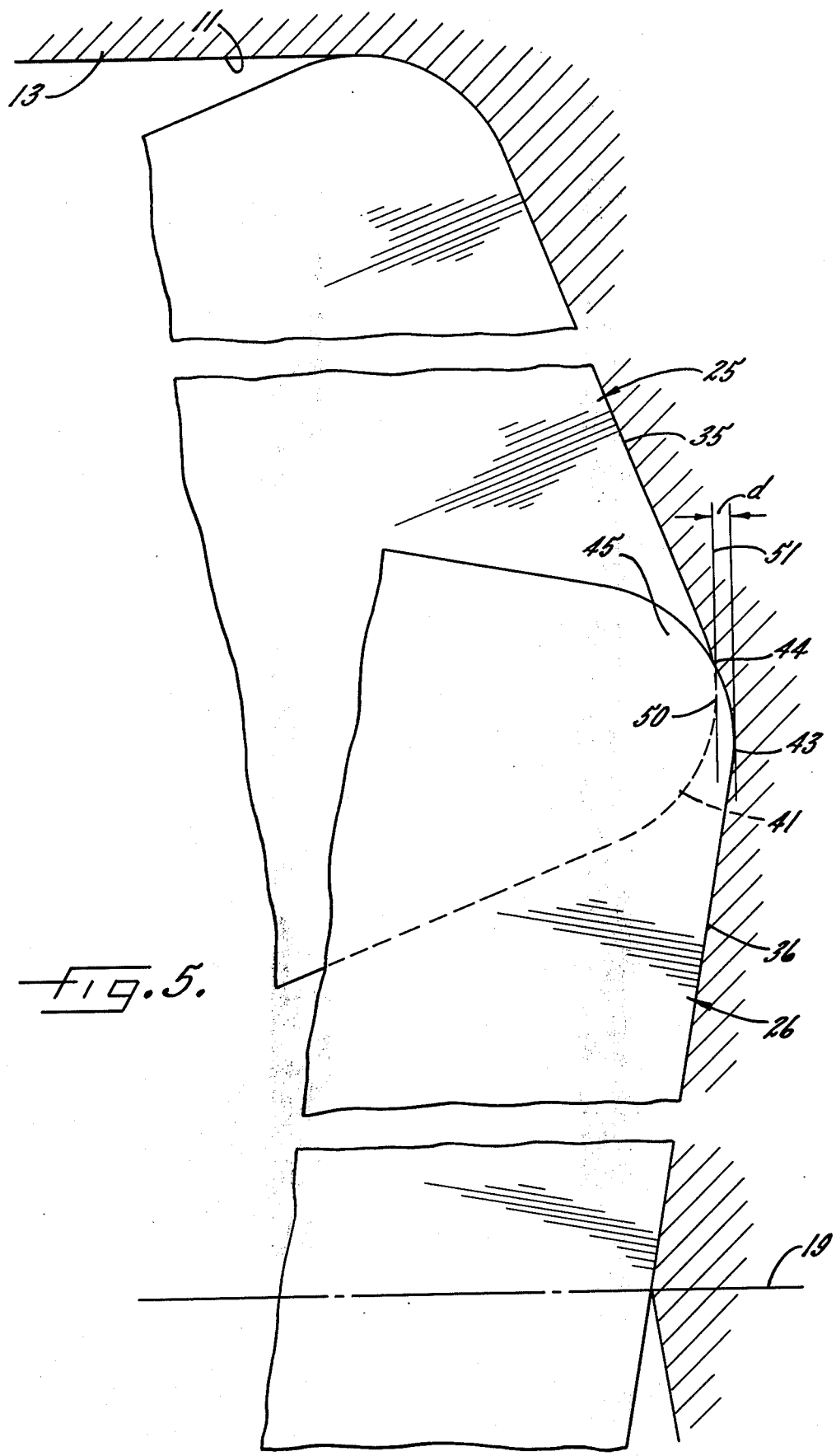
FIG. 5 is a roll-out view which shows the positions the inserts would assume if the outer insert were held stationary and the inner insert were rotated approximately 180 degrees about the axis of the drill.

From FIG. 5, it will be seen that part of the outermost corner portion 45 is located both axially beyond and radially outwardly of the tangency point 50 and that all parts of the innermost corner portion 41 lying radially inwardly of the tangency point are shielded by the outermost corner portion and the adjacent cutting edge 36. As a result, the outermost corner portion 45 establishes axial and radial clearance for that part of the innermost corner portion 41 lying radially inwardly of the tangency point 50. In other words, the outermost corner portion 45 in effect "runs interference" for the inwardly lying part of the innermost corner portion 41 by cutting away metal which otherwise would be encountered by the inwardly lying part and which would cause the inwardly lying part to fracture and break up. With the outer insert being positioned at negative axial and radial angles, the position of the insert is such that there is no clearance at the inwardly lying part of the innermost corner portion 41. But, with the outermost corner portion 45 shielding the inwardly lying part, such clearance is established and keeps the inwardly lying part intact so that the outer insert 25 will not break up. Also, the inwardly lying part will present a fresh, undamaged cutting point when the outer insert 25 is indexed into a position where the outermost corner portion of the outer insert is defined by the previous innermost corner portion 41. Accordingly, the positioning of the inserts increases the service life of the inserts and enables the inserts to repeatedly cut hard materials without being damaged.

In accordance with a further feature of the invention, hard wear strips 53 and 54 (FIGS. 1 and 3) are spaced angularly around and are brazed to the periphery of the body 14 and are engageable with the peripheral wall of the hole 11 to guide the drill 10 for axial movement in a substantially straight line and also to prevent the carbon steel body from rubbing against and being worn by the wall of the hole. Herein, the wear strips 53 and 54 are made of tungsten carbide and project radially outwardly from the body by just a few thousandths of an inch. The outer surface of each strip is set inwardly about .005 inch from the outermost cutting arc of the outer insert 25 and thus the strips do not normally engage the peripheral wall of the hole 11. When cutting forces are imposed on the inserts 25 and 26, however, the drill 10 tends to shift radially in its holder and also to deflect in a radial direction. The wear strips engage the peripheral wall of the hole and limit such radial movement so as to keep the drill moving axially in a substantially straight line. At the same time, the hard wear strips keep the softer body 14 out of engagement with the peripheral wall of the hole and thus prevent wearing of the body.

Preferably, the wear strip 53 is located adjacent the leading wall of the groove 21 and is substantially in radial alinement with the inner insert 26. The wear strip 53 thus absorbs the cutting forces imposed generally edgewise of the inserts 25 and 26. The wear strip 54 is located adjacent the trailing wall of the groove 21 and serves to absorb the forces exerted against the cutting face 31 of the outer insert 25. Both wear strips are of comparatively narrow circumferential width to reduce drag between the wear strips and the peripheral wall of the hole 11. In some instances, the drill may be provided with more than two wear strips and, in other instances, only a single wear strip may be used.

I claim:

1. A drill comprising an elongated and generally cylindrical body adapted to be rotated in a predetermined direction about its own axis and having a shank end and a tip end, first and second angularly spaced grooves formed in said body and opening out of the tip end thereof, first and second recesses at the tip end portions of the respective grooves, first and second indexable cutting inserts seated in the respective recesses and releasably secured to said body, said first recess locating said first insert such that the active cutting edge of said first insert extends outwardly from the center of said body toward the peripheral surface thereof and is disposed at a positive radial angle, said second recess locating said second insert such that the active cutting edge of said second insert extends inwardly from the peripheral surface of said body toward the center thereof and is disposed at a negative radial angle, the active cutting edge of said first insert being inclined so as to progress away from the shank end of said body as such cutting edge progresses outwardly from the center of said body, the active cutting edge of said second insert being inclined so as to progress away from the shank end of said body as such cutting edge progresses inwardly from the peripheral surface of said body, and the radially outermost point of the active cutting edge of said first insert projecting axially beyond the tip end of said body by a greater distance than the radially innermost point of the active cutting edge of said second insert.

2. A drill comprising an elongated and generally cylindrical body adapted to be rotated in a predetermined direction about its own axis and having a shank end and a tip end, first and second angularly spaced grooves formed in said body and opening out of the tip end thereof, first and second recesses at the tip end portions of the respective grooves, first and second indexable cutting inserts seated in the respective recesses and releasably secured to said body, said first recess locating said first insert such that the active cutting edge of said first insert extends outwardly from the center of said body toward the peripheral surface thereof and is disposed at a positive radial angle, said second recess locating said second insert such that the active cutting edge of said second insert extends inwardly from the peripheral surface of said body toward the center thereof and is disposed at a negative radial angle, the active cutting edge of said first insert being inclined so as to progress away from the shank end of said body as such cutting edge progresses outwardly from the center of said body, the active cutting edge of said second insert being inclined so as to progress away from the shank end of said body as such cutting edge progresses inwardly from the peripheral surface of said body, the active cutting edge of each insert having a straight portion which merges into a radiused corner of said insert, and the radially outermost point along the straight portion of the cutting edge of said first insert projecting axially beyond the tip end of said body by a greater distance than the radially innermost point along the straight portion of the cutting edge of said second insert.

3. A drill as defined in claim 2 in which a portion of the radiused corner of said first insert is set out axially ahead of a portion of the radiused corner of said second insert and moves in a path which radially overlaps the path swept by the latter portion.

4. A drill as defined in claim 2 further including a wear strip secured to said body and made of a material which is harder than the material of said body, said wear strip projecting radially outwardly beyond the periphery of said body and being set radially inwardly from the arc swept by the outermost point of said outer insert.

5. A drill as defined in claim 2 further including a plurality of wear strips made of a material which is harder than the material of said body, said strips being spaced angularly around and secured to said body, each of said strips projecting radially outwardly beyond the periphery of said body and being set radially inwardly from the arc swept by the outermost point of said outer insert.

6. A drill as defined in claim 5 in which one of said strips is substantially in radial alinement with the active cutting edge of said first insert and is positioned adjacent one wall of one of said grooves, another one of said wear strips being positioned adjacent the other wall of said one groove.

* * * * *